(12) United States Patent
Ando et al.

(10) Patent No.: US 8,771,130 B2
(45) Date of Patent: Jul. 8, 2014

(54) AUTOMATIC TRANSMISSION

(71) Applicants: Masahiko Ando, Nagoya (JP);
Nobutada Sugiura, Nishio (JP); Hayato Suzuki, Toyota (JP)

(72) Inventors: Masahiko Ando, Nagoya (JP);
Nobutada Sugiura, Nishio (JP); Hayato Suzuki, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/852,471

(22) Filed: Mar. 28, 2013

(65) Prior Publication Data
US 2013/0260948 A1 Oct. 3, 2013

(30) Foreign Application Priority Data

Mar. 28, 2012 (JP) ................. 2012-074915

(51) Int. Cl.
*F16H 3/62* (2006.01)
*F16H 3/44* (2006.01)
*F16H 3/66* (2006.01)

(52) U.S. Cl.
CPC .......... *F16H 3/62* (2013.01); *F16H 2200/2048* (2013.01); *F16H 2200/0069* (2013.01); *F16H 2200/2025* (2013.01); *F16H 2200/2007* (2013.01); *F16H 3/66* (2013.01)
USPC .......................................... 475/276; 475/280

(58) Field of Classification Search
CPC ............... F16H 2200/0069; F16H 2200/2048; F16H 2200/2023; F16H 2200/2025; F16H 2200/2028
USPC .................. 475/276, 280, 282–287, 311–313, 475/317–319, 323–325
See application file for complete search history.

(56) References Cited

U.S. PATENT DOCUMENTS

| | | | |
|---|---|---|---|
| 6,110,069 A | 8/2000 | Taniguchi et al. | |
| 6,723,018 B2 * | 4/2004 | Hayabuchi et al. | 475/276 |
| 7,931,558 B2 * | 4/2011 | Kato et al. | 475/275 |
| 8,298,111 B2 * | 10/2012 | Kato et al. | 475/280 |
| 8,360,924 B2 * | 1/2013 | Kraynev et al. | 475/277 |
| 8,425,368 B2 * | 4/2013 | Phillips et al. | 475/275 |

(Continued)

FOREIGN PATENT DOCUMENTS

| | | |
|---|---|---|
| JP | A-2000-220704 | 8/2000 |
| JP | A-2001-82555 | 3/2001 |

(Continued)

OTHER PUBLICATIONS

International Search Report issued in International Patent Application No. PCT/JP2013/056935 dated May 14, 2013 (w/translation).

*Primary Examiner* — Tisha Lewis
(74) *Attorney, Agent, or Firm* — Oliff PLC (57) ABSTRACT

An automatic transmission is configured to achieve at least ten forward speeds and one reverse speeds. This is achieved through the use of two planetary gear sets with a plurality of clutches and brakes configured to operably couple different components of the two planetary gears to achieve different speeds. For example, operation of a first clutch inputs decelerated rotation of a reduction planetary gear to a third sun gear. Operation of a second clutch transmits from an input shaft to a third ring gear, a third clutch inputs decelerated rotation of the reduction planetary gear to the second sun gear, a fourth clutch transmits from the input shaft to the second carrier, a first brake prevents a second sun gear from rotating, a second brake prevents a carrier from rotating, a third brake capable prevents a third ring gear from rotating.

6 Claims, 8 Drawing Sheets

(56) References Cited

U.S. PATENT DOCUMENTS

| | | |
|---|---|---|
| 2003/0216211 A1 | 11/2003 | Miyazaki et al. |
| 2005/0026739 A1 | 2/2005 | Ishimaru |
| 2005/0043134 A1 | 2/2005 | Tabata et al. |
| 2007/0287572 A1 | 12/2007 | Tabata et al. |
| 2009/0048057 A1 | 2/2009 | Choi |
| 2011/0218074 A1* | 9/2011 | Kraynev et al. ............... 475/271 |

FOREIGN PATENT DOCUMENTS

| | | |
|---|---|---|
| JP | A-2003-336699 | 11/2003 |
| JP | A-2005-42790 | 2/2005 |
| JP | A-2005-61552 | 3/2005 |
| JP | A-2006-161927 | 6/2006 |
| JP | A-2009-47303 | 3/2009 |
| JP | A-2010-169108 | 8/2010 |

* cited by examiner

| | C-1 | C-2 | C-3 | C-4 | B-1 | B-2 | B-3 | GEAR RATIO | STEP |
|---|---|---|---|---|---|---|---|---|---|
| 1st | ○ | | | | | | ○ | 5.067 | >1.933 |
| 2nd | ○ | | | | | ○ | | 2.621 | >1.431 |
| 3rd | ○ | | | ○ | | | | 1.832 | >1.205 |
| 4th | ○ | | ○ | | | | | 1.520 | >1.218 |
| 5th | ○ | | | | ○ | | | 1.248 | >1.120 |
| 6th | ○ | ○ | | | | | | 1.114 | >1.114 |
| 7th | | ○ | | | ○ | | | 1.000 | >1.033 |
| 8th | | ○ | ○ | | | | | 0.968 | >1.061 |
| 9th | | ○ | | | | ○ | | 0.912 | >1.272 |
| 10th | | | | ○ | | ○ | | 0.717 | |
| Rev | | | ○ | | | ○ | | 3.848 | |

SPREAD 7.067

|  | C-1 | C-2 | C-3 | C-4 | B-1 | B-2 | B-3 | GEAR RATIO | STEP |
|---|---|---|---|---|---|---|---|---|---|
| 1st | ○ |  |  |  |  |  | ○ | 6.198 | > 1.800 |
| 2nd | ○ |  |  |  |  | ○ |  | 3.444 | > 1.407 |
| 3rd | ○ |  |  |  | ○ |  |  | 2.447 | > 1.175 |
| 4th | ○ |  | ○ |  |  |  |  | 2.083 | > 1.428 |
| 5th | ○ |  |  | ○ |  |  |  | 1.459 | > 1.204 |
| 6th | ○ | ○ |  |  |  |  |  | 1.212 | > 1.212 |
| 7th |  | ○ |  | ○ |  |  |  | 1.000 | > 1.050 |
| 8th |  | ○ | ○ |  |  |  |  | 0.952 | > 1.044 |
| 9th |  | ○ |  |  | ○ |  |  | 0.912 | > 1.244 |
| 10th |  |  |  | ○ | ○ |  |  | 0.733 |  |
| Rev |  |  | ○ |  |  | ○ |  | 5.708 |  |

SPREAD 8.460

AUTOMATIC TRANSMISSION

INCORPORATION BY REFERENCE

The disclosure of Japanese Patent Application No. 2012-074915 filed on Mar. 28, 2012 including the specification, drawings and abstract is incorporated herein by reference in its entirety.

BACKGROUND OF THE INVENTION

The present invention relates to automatic transmissions that are mounted on, for example, vehicles etc., and more particularly to automatic transmissions that include a reduction planetary gear capable of outputting decelerated rotation and a planetary gear set achieving multi-speed shifting based on decelerated rotation and input rotation.

DESCRIPTION OF THE RELATED ART

In recent years, the number of shift speeds of stepped automatic transmissions that are mounted on vehicles has been increased in order to improve fuel economy of the vehicles. Stepped automatic transmissions that include a reduction planetary gear capable of outputting decelerated rotation and a planetary gear set achieving multi-speed shifting based on decelerated rotation and input rotation have been proposed as such stepped automatic transmissions (see Japanese Patent Application Publication No. 2000-220704 (JP 2000-220704 A) and Japanese Patent Application Publication No. 2006-161927 (JP 2006-161927 A)).

In the automatic transmission of JP 2000-220704 A, decelerated rotation decelerated by a reduction planetary gear can be input by two clutches (C-1, C-3) to two rotating elements (S2, S3) of a Ravigneaux type planetary gear formed by four rotating elements, and input rotation of an input shaft can be input by one clutch (C-2) to one rotating element (C2). Moreover, two rotating elements (S2, C2) can be locked by two brakes (B-1, B-2). This automatic transmission achieves six forward speeds and one reverse speed in this manner.

On the other hand, in the automatic transmission shown by, for example, FIG. 7 of JP 2006-161927 A, a planetary gear set is not formed by a Ravigneaux type planetary gear, but instead is formed by a planetary gear set in which a long pinion is formed by a stepped pinion having a stepped portion and which is formed by five rotating elements additionally including a ring gear (R2). Decelerated rotation decelerated by a reduction planetary gear can be input by one clutch (C-3) to one rotating element (CR2) of the Ravigneaux type planetary gear set formed by the five rotating elements, and input rotation of an input shaft can be input by two clutches (C-1, C-2) to two rotating elements (S2, R2). Moreover, three rotating elements (CR2, S3, R2) can be locked by three brakes (B-1, B-2, B-3). This automatic transmission achieves eight forward speeds and one reverse speed in this manner.

SUMMARY OF THE INVENTION

One method to further increase the number of shift speeds from that of the automatic transmission of JP 2000-220704 A or JP 2006-161927 A is to merely add a planetary gear, but this may hinder downsizing and weight reduction. It is therefore possible to increase the number of shift speeds by changing the Ravigneaux type planetary gear of JP 2000-220704 A to such a planetary gear set formed by the five rotating elements as in JP 2006-161927 A.

However, in the case where the planetary gear set is used in the manner described in JP 2006-161927 A, it is difficult to increase the gear spread (the gear ratio coverage=minimum shift speed/maximum shift speed) (in FIG. 8 of JP 2006-161927 A, the spread is 5.856=3.359/0.613). Thus, merely increasing the number of shift speeds does not improve fuel economy unless the gear spread (the speed ratio coverage) is increased, because it is difficult to optimize the engine speed usage region with respect to the vehicle speed. Moreover, gear meshing loss at the maximum shift speed that is used for a relatively long time during, for example, high-speed traveling etc. need also be considered in order to improve the fuel economy.

It is an object of the present invention to provide an automatic transmission that achieves at least ten forward speeds and one reverse speed and achieves downsizing and weight reduction, and that is capable of increasing the gear spread and reducing gear meshing loss at the maximum shift speed.

An automatic transmission according to an aspect of the present invention includes: an input shaft that is drivingly coupled to a drive source; a reduction planetary gear that has a first sun gear, a first carrier, and a first ring gear, and that can output decelerated rotation decelerated from input rotation of the input shaft; a planetary gear set that has a second sun gear, a third sun gear, a second carrier supporting a short pinion meshing with the third sun gear and a stepped pinion having a small diameter portion meshing with the short pinion and a large diameter portion meshing with the second sun gear such that the short pinion and the stepped pinion are rotatable, a second ring gear meshing with the large diameter portion, and a third ring gear meshing with the small diameter portion; a first clutch capable of inputting the decelerated rotation of the reduction planetary gear to the third sun gear; a second clutch capable of inputting the input rotation of the input shaft to the third ring gear; a third clutch capable of inputting the decelerated rotation of the reduction planetary gear to the second sun gear; a fourth clutch capable of inputting the input rotation of the input shaft to the second carrier; a first brake capable of preventing the second sun gear from rotating; a second brake capable of preventing the second carrier from rotating; a third brake capable of preventing the third ring gear from rotating; and an output member drivingly coupled to the second ring gear. The automatic transmission is configured to achieve at least ten forward speeds and one reverse speed.

Thus, the automatic transmission can be provided which achieves ten forward speeds and one reverse speeds and which is capable of obtaining a relatively satisfactory step ratio between the shift speeds. The gear spread from the minimum shift speed to the maximum shift speed can be increased. This makes it easier to optimize the engine speed usage region with respect to the vehicle speed in a vehicle having the automatic transmission mounted thereon, and can improve fuel economy. Moreover, since the maximum shift speed is achieved by engagement of the fourth clutch and the first brake, the maximum shift speed can be obtained by meshing at only two locations, namely, meshing between the second sun gear and the large diameter portion of the stepped pinion and meshing between the second ring gear and the large diameter portion of the stepped pinion. This can minimize gear meshing loss at the maximum shift speed that is used for a relatively long time, and can improve fuel economy.

In the automatic transmission according to the aspect of the present invention, the reduction planetary gear (DP) is formed by a double pinion planetary gear in which the first carrier (CR1) has a first pinion (P1) meshing with the first sun gear (S1) and a second pinion (P2) meshing with the first pinion (P1) and the first ring gear (R1), and rotatably supports the first pinion (P1) and the second pinion (P2), and the first sun gear may be held stationary, the input shaft may be drivingly coupled to the first carrier, and the decelerated rotation may be output from the first ring gear.

Thus, since the reduction planetary gear may be formed by the double pinion planetary gear, the speed reduction ratio in the reduction planetary gear can be increased, and a satisfactory step interval of the gear ratio can be obtained particularly at a low shift speed.

In the automatic transmission according to the aspect of the present invention, the output member may be formed by a counter gear placed between the reduction planetary gear and the planetary gear set in an axial direction.

Thus, since the output member may be formed by the counter gear placed between the reduction planetary gear and the planetary gear set in the axial direction, this automatic transmission can be used in a preferable manner in vehicles in which an output shaft (crankshaft) of an engine is placed transversely with respect to a travel direction of the vehicle.

In the automatic transmission according to the aspect of the present invention, a friction plate of the second brake and a friction plate of the third brake may be placed on an outer peripheral side of the planetary gear set so as to overlap in the axial direction as viewed in a radial direction.

Thus, since the friction plate of the second brake and the friction plate of the third brake may be placed on the outer peripheral side of the planetary gear set so as to overlap in the axial direction as viewed in the radial direction, the second brake and the third brake can be arranged without causing interference between the members, and the automatic transmission can be configured in a compact manner in the axial direction.

In the automatic transmission according to the aspect of the present invention, a hydraulic servo of the second clutch and a hydraulic servo of the fourth clutch may be placed on an axially opposite side of the planetary gear set from the output member, and the hydraulic servo of the second clutch may be placed on an outer peripheral side of the hydraulic servo of the fourth clutch so as to overlap in the axial direction as viewed in the radial direction.

Thus, since the hydraulic servo of the second clutch and the hydraulic servo of the fourth clutch may be placed on the axially opposite side of the planetary gear set from the output member, and the hydraulic servo of the second clutch may be placed on the outer peripheral side of the hydraulic servo of the fourth clutch so as to overlap in the axial direction as viewed in the radial direction, the second clutch and the fourth clutch can be arranged without causing interference between the members, and the automatic transmission can be configured in a compact manner in the axial direction as compared to the case where the second clutch and the fourth clutch are arranged next to each other in the axial direction.

In the automatic transmission according to the aspect of the present invention, the first clutch, the third clutch, and the first brake may be placed on an axially opposite side of the output member from the planetary gear set.

Thus, since the first clutch, the third clutch, and the first brake may be placed on the axially opposite side of the output member from the planetary gear set, the first clutch, the third clutch, and the first brake can be arranged in a compact manner without causing interference between the members. Moreover, the structure on the axially opposite side of the output member from the planetary gear set can be made similar to the structure of the existing automatic transmission. Thus, the automatic transmission of the present invention and the existing automatic transmission can be produced on a common production line, whereby the automatic transmission capable of achieving ten forward speeds and one reverse speed can be provided at low cost.

DETAILED DESCRIPTION OF THE EMBODIMENTS

First Embodiment

Figure 1:
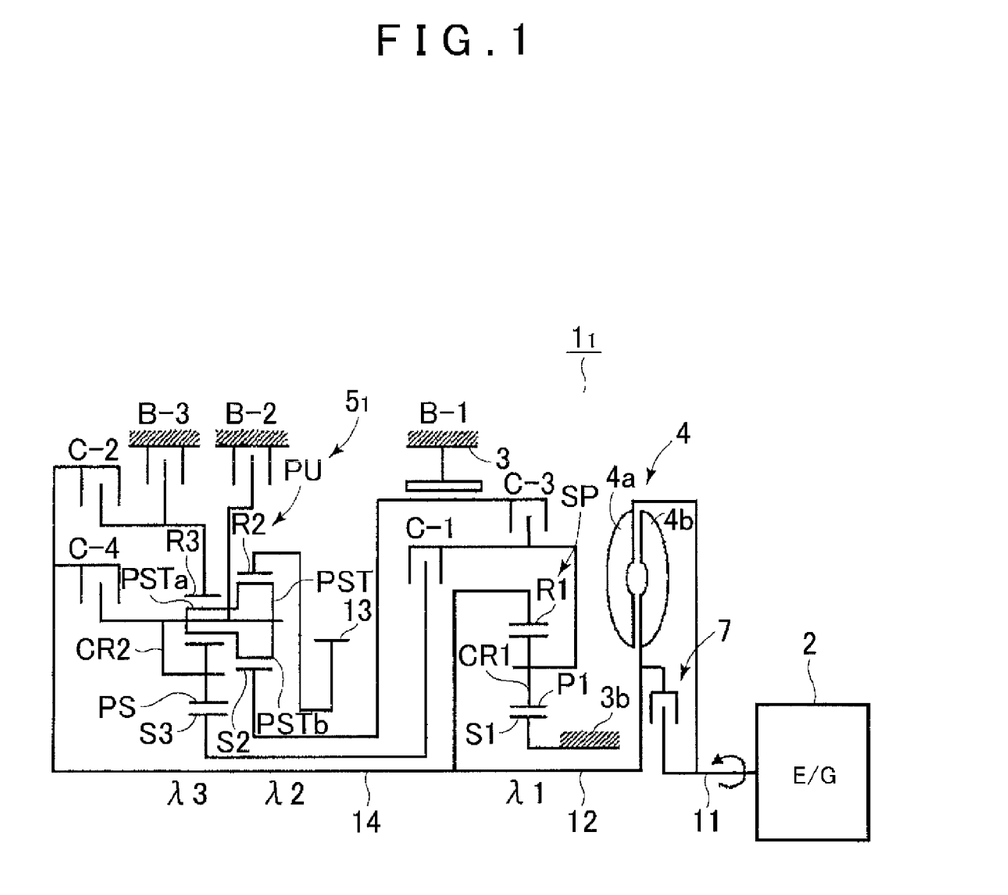
FIG. 1 is a skeleton diagram showing an automatic transmission $1_1$ according to a first embodiment.

A first embodiment of the present invention will be described below with reference to FIGS. 1 to 4. First, the general configuration of an automatic transmission $1_1$ to which the present invention can be applied will be described with reference to FIG. 1. As shown in FIG. 1, the automatic transmission $1_1$ that is preferably used for, for example, front-engine, front-drive (FF) type vehicles has an input shaft 11 of the automatic transmission $1_1$ which can be connected to an engine (drive source) 2, and includes a torque converter 4 and a speed change mechanism $5_1$ which are disposed about the axial direction of the input shaft 11.

In the automatic transmission $1_1$ that is described below and is preferably mounted on an FF type vehicle, the lateral direction in the figures actually corresponds to the lateral direction of the vehicle, and as used herein, the "front side" refers to the engine 2 side of a power transmission path in the axial direction, and the "rear side" refers to the opposite side of the power transmission path from the engine 2 in the axial direction.

The torque converter 4 has a pump impeller 4a connected to the input shaft 11 of the automatic transmission $1_1$, and a turbine runner 4b to which rotation of the pump impeller 4a is transmitted via working fluid. The turbine runner 4b is connected to an input shaft 12 of the speed change mechanism $5_1$ which is disposed coaxially with the input shaft 11. The torque converter 4 is provided with a lockup clutch 7. When the lockup clutch 7 is engaged by hydraulic control of a hydraulic control device, not shown, the input shaft 11 of the automatic transmission $1_1$ is directly drivingly coupled to the input shaft 12 of the speed change mechanism $5_1$.

The speed change mechanism $5_1$ is provided with a planetary gear (reduction planetary gear) SP and a planetary gear unit (planetary gear set) PU on the axis of the input shaft 12 and an intermediate shaft 14 (see FIG. 4) coupled to the input shaft 12. The planetary gear SP is a so-called single-pinion planetary gear which includes a first sun gear S1, a first carrier CR1, and a first ring gear R1, and in which the first carrier CR1 has a single pinion P1 meshing with the first sun gear S1 and the first ring gear R1 and rotatably supports the pinion P1.

The planetary gear unit PU has a second sun gear S2, a third sun gear S3, a second carrier CR2, a second ring gear R2, and a third ring gear R3 as five rotating elements. In the planetary gear unit PU, The second carrier CR2 has a short pinion PS meshing with the third sun gear S3, and a stepped pinion PST having a small diameter portion PSTa meshing with the short pinion PS and a large diameter portion PSTb meshing with the second sun gear S2, and rotatably supports the short pinion PS and the stepped pinion PST.

The first sun gear S1 of the planetary gear SP is connected to a boss portion 3b integrally fixed to a case 3 described in detail below, and is held stationary. The first ring gear R1 is connected to the input shaft 12, and makes the same rotation (hereinafter referred to as the "input rotation") as that of the input shaft 12. Moreover, the first carrier CR1 makes decelerated rotation that is decelerated from the input rotation by the first sun gear S1 held stationary and the first ring gear R1 making the input rotation, and is connected to a first clutch C-1 and a third clutch C-3.

The second sun gear S2 of the planetary gear unit PU is connected to a first brake B-1 formed by a band brake, and can be locked (fixed) with respect to the case 3. The second sun gear S2 of the planetary gear unit PU is also connected to the third clutch C-3, so that the second sun gear S2 can receive the decelerated rotation of the first carrier CR1 via the third clutch C-3. The third sun gear S3 is connected to the first clutch C-1, so that the third sun gear S3 can receive the decelerated rotation of the first carrier CR1.

Moreover, the second carrier CR2 is connected to a fourth clutch C-4 that receives the rotation of the input shaft 12 via the intermediate shaft 14, so that the second carrier CR2 can receive the input rotation via the fourth clutch C-4. The second carrier CR2 is also connected to a second brake B-2, so that the second brake B-2 can prevent the second carrier CR2 from rotating. In addition, the third ring gear R3 is connected to a second clutch C-2 that receives the rotation of the input shaft 12 via the intermediate shaft 14, so that the third ring gear R3 can receive the input rotation via the second clutch C-2. The third ring gear R3 is also connected to a third brake B-3, so that the third brake B-3 can prevent the third ring gear R3 from rotating. The second ring gear R2 is connected to a counter gear (output member) 13 that outputs rotation to wheels via a countershaft and a differential unit, both not shown.

Functions of the speed change mechanism $5_1$ will be described based on the above configuration with reference to FIGS. 1, 2, and 3. In the velocity diagram of FIG. 3, the ordinate represents the rotational speed of each rotating element (each gear), and the abscissa corresponds to the gear ratio of the rotating elements. In the portion corresponding to the planetary gear SP in the velocity diagram, the ordinate in the endmost portion in the lateral direction (on the right side in FIG. 3) corresponds to the first sun gear S1, and the ordinate sequentially corresponds to the first carrier CR1 and the first ring gear R1 leftward in the figure. The gear ratio of the first sun gear S1 and the first carrier CR1 is "1," and the gear ratio of the first carrier CR1 and the first ring gear R1 is "λ1." "λ1" is the ratio of the number of teeth in the planetary gear SP.

Moreover, in the portion corresponding to the planetary gear unit PU in the velocity diagram, the ordinate in the endmost portion in the lateral direction (on the right side in FIG. 3) corresponds to the third sun gear S3, and the ordinate sequentially corresponds to the second ring gear R2, the third ring gear R3, the second carrier CR2, and the second sun gear S2 leftward in the figure. The gear ratio of the second sun gear S2 and the second carrier CR2 is "1/λ2," the gear ratio of the third sun gear S3 and the second carrier CR2 is "0.5789/λ3," the gear ratio of the second carrier CR2 and the second ring gear R2 is "1," and the gear ratio of the second carrier CR2 and the third ring gear R3 is "0.5789." "λ2" is the ratio of the number of teeth in a planetary gear portion on the front side (the engine side) meshing with the large diameter portion PSTb of the stepped pinion PST in the planetary gear unit PU, and "λ3" is the ratio of the number of teeth in a planetary gear portion on the rear side (the opposite side from the engine) meshing with the small diameter portion PSTa of the stepped pinion PST in the planetary gear unit PU.

The ratios of the number of teeth λ1, λ2, and λ3 are obtained from an optimal number of teeth by determining the sun gear diameter and the ring gear diameter from the outer diameter of a transmission case of an existing automatic transmission (for example, an automatic transmission achieving eight forward speeds and one reverse speed), the outer diameter of an input shaft based on known input torque to the input shaft (due to, for example, engine performance), etc., and determining the pinion diameter and the carrier diameter. The gear ratio of each shift speed described below is the gear ratio obtained by optimizing setting of the ratios of the number of teeth λ1, λ2, and λ3.

Figure 2:
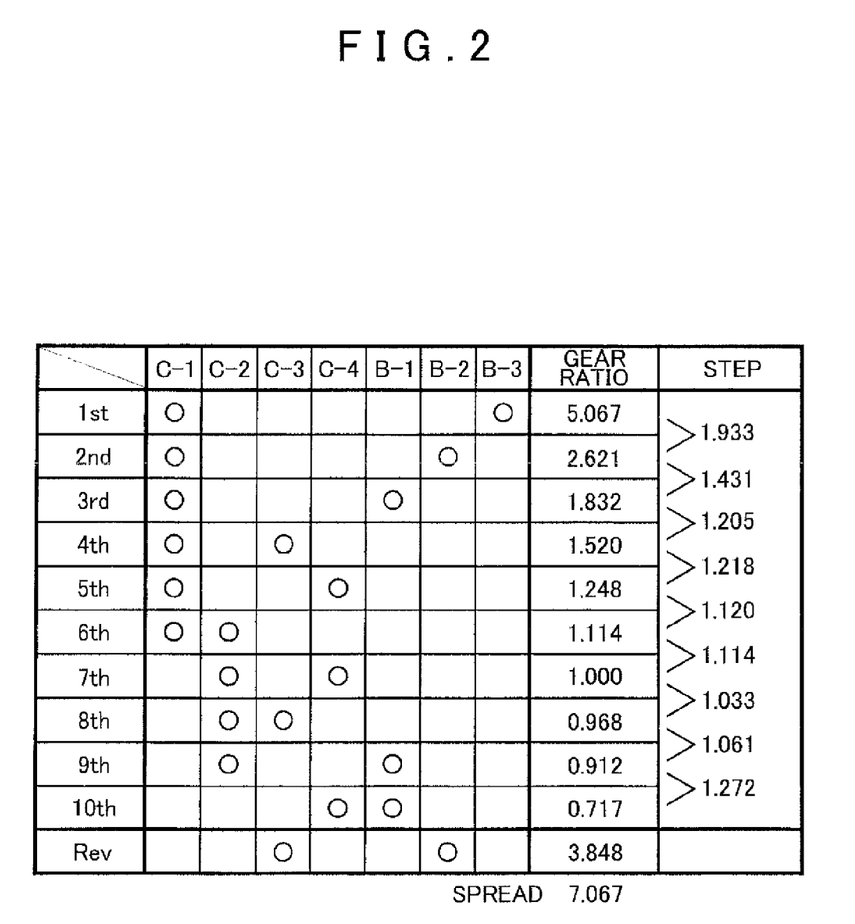
FIG. 2 is an engagement table of the automatic transmission $1_1$ according to the first embodiment.

For example, at a first forward speed (1st) in the drive (D) range, as shown in FIG. 2, the first clutch C-1 and the third brake B-3 are engaged. Thus, as shown in FIGS. 1 and 3, rotation of the first carrier CR1 that makes decelerated rotation by the first sun gear S1 held stationary and the first ring gear R1 making the input rotation is input to the third sun gear S3 via the first clutch C-1. Since the third brake B-3 is locked, the third ring gear R3 is prevented from rotating. Thus, the second carrier CR2 makes slight reverse rotation, and the decelerated rotation that has been input to the third sun gear S3 is output to the second ring gear R2 via the second carrier CR2 making the slight reverse rotation, and forward rotation at the gear ratio of 5.067 as the first forward speed is output from the counter gear 13.

At a second forward speed (2nd), as shown in FIG. 2, the first clutch C-1 is engaged, and the second brake B-2 is locked. Thus, as shown in FIGS. 1 and 3, rotation of the first carrier CR1 that makes decelerated rotation by the first sun gear S1 held stationary and the first ring gear R1 making the input rotation is input to the third sun gear S3 via the first clutch C-1. Since the second brake B-2 is locked, the second carrier CR2 is prevented from rotating. Thus, the decelerated rotation that has been input to the third sun gear S3 is output to the second ring gear R2 via the second carrier CR2 held stationary, and forward rotation at the gear ratio of 2.621 as the second forward speed is output from the counter gear 13.

At a third forward speed (3rd), as shown in FIG. 2, the first clutch C-1 is engaged, and the first brake B-1 is locked. Thus, as shown in FIGS. 1 and 3, rotation of the first carrier CR1 that makes decelerated rotation by the first sun gear S1 held stationary and the first ring gear R1 making the input rotation is input to the third sun gear S3 via the first clutch C-1. Since the first brake B-1 is locked, the second sun gear S2 is prevented from rotating. Thus, the decelerated rotation that has been input to the third sun gear S3 is output to the second ring gear R2 via the second carrier CR2 making slight forward rotation, and forward rotation at the gear ratio of 1.832 as the third forward speed is output from the counter gear 13.

At a fourth forward speed (4th), as shown in FIG. 2, the first clutch C-1 and the third clutch C-3 are engaged. Thus, as shown in FIGS. 1 and 3, rotation of the first carrier CR1 that makes decelerated rotation by the first sun gear S1 held stationary and the first ring gear R1 making the input rotation is input to the third sun gear S3 via the first clutch C-1 and is input to the second sun gear S2 via the third clutch C-3. The entire planetary gear unit PU is thus brought into a directly coupled state by the decelerated rotation from the planetary gear SP, and forward rotation at the gear ratio of 1.520 as the fourth forward speed is output from the counter gear 13.

At a fifth forward speed (5th), as shown in FIG. 2, the first clutch C-1 and the fourth clutch C-4 are engaged. Thus, as shown in FIGS. 1 and 3, rotation of the first carrier CR1 that makes decelerated rotation by the first sun gear S1 held stationary and the first ring gear R1 making the input rotation is input to the third sun gear S3 via the first clutch C-1, and the input rotation is input to the second carrier CR2 via the fourth clutch C-4. Accordingly, rotation slightly accelerated with respect to the decelerated rotation by the input rotation due to the decelerated rotation that has been input to the third sun gear 83 and the second carrier CR2 making the input rotation is output to the second ring gear R2, and forward rotation at the gear ratio of 1.248 as the fifth forward speed is output from the counter gear 13.

At a sixth forward speed (6th), as shown in FIG. 2, the first clutch C-1 and the second clutch C-2 are engaged. Thus, as shown in FIGS. 1 and 3, rotation of the first carrier CR1 that makes decelerated rotation by the first sun gear S1 held stationary and the first ring gear R1 making the input rotation is input to the third sun gear S3 via the first clutch C-1, and the input rotation is input to the third ring gear R3 via the second clutch C-2. Accordingly, the second carrier CR2 makes rotation slightly accelerated with respect to the input rotation due to the decelerated rotation that has been input to the third sun gear S3 and the third ring gear R3 making the input rotation, and the rotation slightly decelerated with respect to the input rotation is output to the second ring gear R2. Thus, forward rotation at the gear ratio of 1.114 as the sixth forward speed is output from the counter gear 13.

At a seventh forward speed (7th), as shown in FIG. 2, the second clutch C-2 and the fourth clutch C-4 are engaged. Thus, as shown in FIGS. 1 and 3, since the second clutch C-2 is engaged, the input rotation is input to the third ring gear R3. Moreover, since the fourth clutch C-4 is engaged, the input rotation is input to the second carrier CR2. The entire planetary gear unit PU is thus brought into a directly coupled state by the input rotation, and forward rotation at the gear ratio of 1.000 as the seventh forward speed is output from the counter gear 13.

At an eighth forward speed (8th), as shown in FIG. 2, the second clutch C-2 and the third clutch C-3 are engaged. Thus, as shown in FIGS. 1 and 3, rotation of the first carrier CR1 that makes decelerated rotation by the first sun gear S1 held stationary and the first ring gear R1 making the input rotation is input to the second sun gear S2 via the third clutch C-3, and the input rotation is input to the third ring gear R3 via the second clutch C-2. Accordingly, rotation slightly accelerated with respect to the input rotation due to the decelerated rotation that has been input to the second sun gear S2 and the third ring gear R3 making the input rotation is output to the second ring gear R2, and forward rotation at the gear ratio of 0.968 as the eighth forward speed is output from the counter gear 13.

At a ninth forward speed (9th), as shown in FIG. 2, the second clutch C-2 is engaged and the first brake B-1 is locked. Thus, as shown in FIGS. 1 and 3, since the first brake B-1 is locked, the second sun gear S2 is prevented from rotating. Moreover, the input rotation is input to the third ring gear R3 via the second clutch C-2. Accordingly, rotation slightly accelerated with respect to the eighth forward speed by the second sun gear S2 held stationary and the third ring gear R3 making the input rotation is output to the second ring gear R2, and forward rotation at the gear ratio of 0.912 as the ninth forward speed is output from the counter gear 13.

At a tenth forward speed (10th), as shown in FIG. 2, the fourth clutch C-4 and the first brake B-1 are engaged. Thus, as shown in FIGS. 1 and 3, since the first brake B-1 is locked, the second sun gear S2 is prevented from rotating. Moreover, the input rotation is input to the second carrier CR2 via the fourth clutch C-4. Accordingly, rotation slightly accelerated with respect to the ninth forward speed by the second sun gear S2 held stationary and the second carrier CR2 making the input rotation is output to the second ring gear R2, and forward rotation at the gear ratio of 0.717 as the tenth forward speed is output from the counter gear 13.

At this tenth forward speed (10th), the tenth forward speed is achieved by meshing only in the planetary gear portion on the front side (the engine side) in the planetary gear unit PU. That is, the tenth forward speed is achieved by meshing at two locations, namely, meshing between the second sun gear S2 and the large diameter portion PSTb of the stepped pinion PST, and meshing between the large diameter portion PSTb of the stepped pinion PST and the second ring gear R2. This minimizes gear meshing loss at the maximum shift speed at which the number of meshing locations in the planetary gear unit PU is the smallest, and which is likely to be used for a relatively long time on highways or the like.

At a reverse speed (Rev), as shown in FIG. 2, the third clutch C-3 is engaged, and the second brake B-2 is locked. Thus, as shown in FIGS. 1 and 3, rotation of the first carrier CR1 that makes decelerated rotation by the first sun gear S1 held stationary and the first ring gear R1 making the input rotation is input to the second sun gear S2 via the third clutch C-3. Since the second brake B-2 is locked, the second carrier CR2 is prevented from rotating. Thus, the decelerated rotation that has been input to the second sun gear S2 is output as reverse rotation to the second ring gear R2 via the second carrier CR2 held stationary, and reverse rotation at the gear ratio of 3.848 as the reverse speed is output from the counter gear 13.

Figure 3:
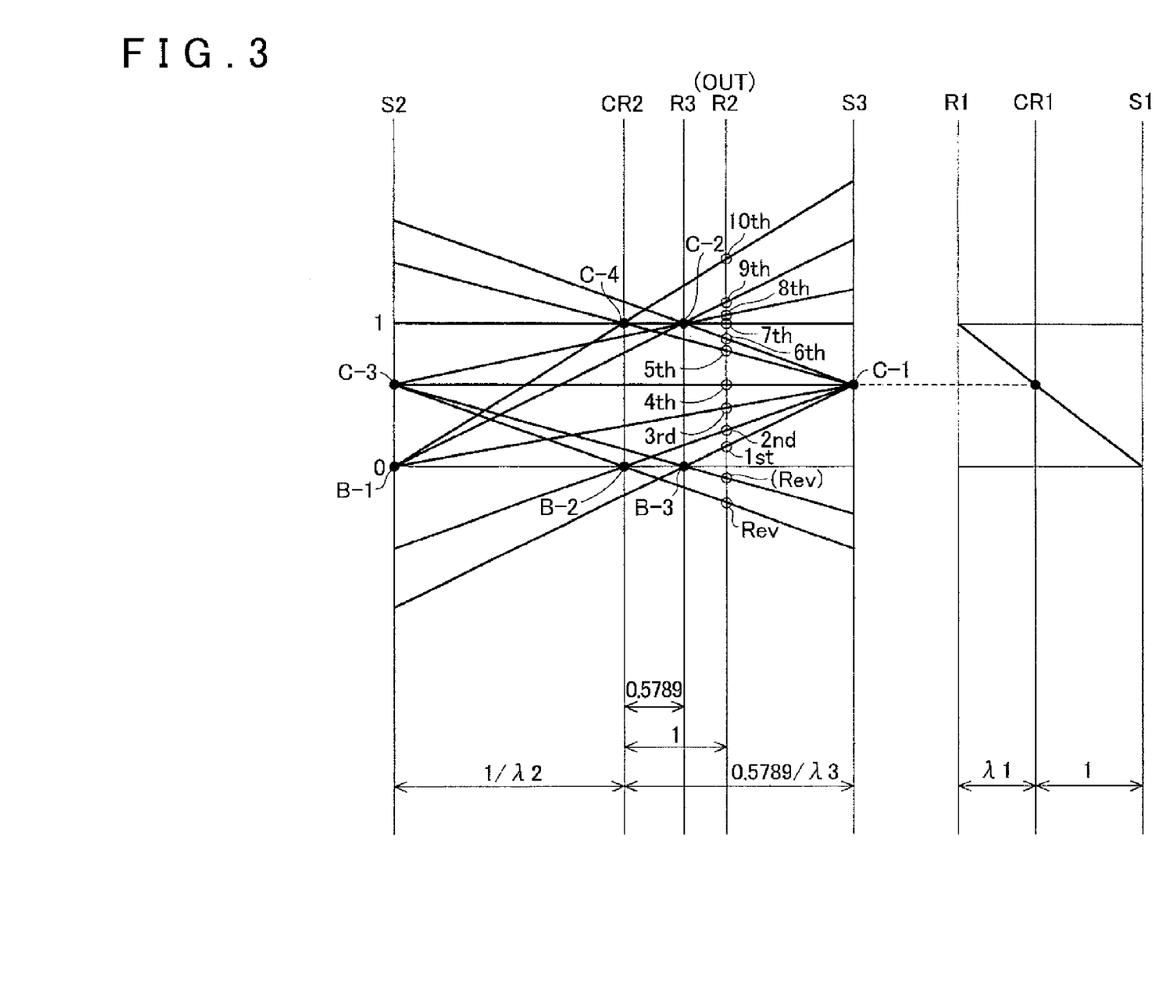
FIG. 3 is a velocity diagram of the automatic transmission $1_1$ according to the first embodiment.

This automatic transmission $1_1$ can also achieve a reverse speed ((Rev)) having a large gear ratio as shown in FIG. 3. In this case, the third clutch C-3 is engaged, and the third brake B-3 is latched. Thus, as shown in FIGS. 1 and 3, rotation of the first carrier CR1 that makes decelerated rotation by the first sun gear S1 held stationary and the first ring gear R1 making the input rotation is input to the second sun gear S2 via the third clutch C-3. Since the third brake B-3 is locked, the third ring gear R3 is held stationary. Thus, the decelerated rotation that has been input to the second sun gear S2 is output as reverse rotation to the second ring gear R2 via the second carrier CR2 making slight forward rotation by the third ring gear R3 is prevented from rotating, and the reverse rotation as the reverse speed having the large gear ratio is output from the counter gear 13.

This automatic transmission $1_1$ can also achieve an eleventh forward speed by engaging the second clutch C-2 and engaging the second brake B-2 (see, for example, FIG. 3). However, this automatic transmission $1_1$ does not achieve this eleventh forward speed because it requires disengagement of the fourth clutch C-4 and the first brake B-1 from the tenth forward speed and engagement of the second clutch C-2 and locking of the second brake B-2, namely, it requires engagement/disengagement of the four friction engagement elements. In the case where the automatic transmission $1_1$ does not achieve the tenth forward speed and achieves the eleventh forward speed described above, it requires disengagement of the first brake B-1 and engagement of the second brake B-2 with the second clutch C-2 being held engaged, namely, it requires engagement/disengagement of only two friction engagement elements. However, this is not preferable because the gear ratio step becomes too large.

In a parking (P) range and a neutral (N) range, for example, the first clutch C-1, the second clutch C-2, the third clutch C-3, and the fourth clutch C-4 are disengaged. Thus, the first carrier CR1 is disconnected from the third sun gear S3, and the first carrier CR1 is disconnected from the second sun gear S2. Namely, the planetary gear DP is disconnected from the planetary gear unit PU. Moreover, the input shaft 12 (the intermediate shaft 14) is disconnected from the second carrier CR2, and the input shaft 12 (the intermediate shaft 14) is disconnected from the third ring gear R3. Thus, power transmission between the input shaft 12 and the planetary gear unit PU is cut off. Namely, power transmission between the input shaft 12 and the counter gear 13 is cut off.

The general configuration of the speed change mechanism $5_1$, especially the relative positional relation between the components, will be briefly described with reference to FIG. 4.

In the following description, each of the terms "clutch" (the first to fourth clutches C-1 to C-4) and "brake" (the first to third brakes B-1 to B-3) is used as including friction plates (outer and inner friction plates) and a hydraulic servo that engages and disengages the clutch or brake.

As shown in FIG. 1, the speed change mechanism $5_1$ is accommodated in the case 3, and an oil pump unit 6 serves as a partition wall on the front side of the case 3, and closes the front side of the case 3. A sleeve-like boss portion 6a extended toward the rear side is formed on the inner peripheral side of the oil pump unit 6, and a hollow stator shaft 8 that supports a stator of the torque converter 4, not shown, is fixedly attached to the inner peripheral side of the boss portion 6a. The boss portion 6a of the oil pump unit 6 and the stator shaft 8 form the boss portion 3b of the case 3 in a broad sense. A boss portion 3a extended toward the front side is formed in an inner peripheral portion on the rear side of the case 3.

The input shaft 12 and the intermediate shaft 14, which are spline coupled together approximately in the center to form a single shaft, are placed in the central portions of the boss portions 3a, 3b. The input shaft 12 and the intermediate shaft 14 are rotatably supported with both ends thereof being supported by the boss portions 3a, 3b.

An axially front portion of the speed change mechanism $5_1$ will be described. The planetary gear SP, the first clutch C-1, the third clutch C-3, and the first brake B-1 are placed on the outer peripheral side of the input shaft 12, specifically on the axially opposite side of the counter gear 13 described in detail below from the planetary gear unit PU.

More specifically, in the planetary gear SP, the first sun gear S1 is spline coupled and fixed to the tip end of the boss portion 3b, and the first carrier CR1 that rotatably supports the pinion P1 is placed on the outer peripheral side of the first sun gear S1. Moreover, the first ring gear R1 is placed on the outer peripheral side of the pinion P1. The first ring gear R1 extends on the rear side of the first carrier CR1, and is coupled to the input shaft 12.

A side plate on the front side of the first carrier CR1 is coupled to a hub member 29 placed so as to cover the outer peripheral side of the first ring gear R1. Friction plates 41 of the third clutch C-3 are placed on the outer peripheral side of the front side of the hub member 29. A hydraulic servo 40 of the third clutch C-3 is placed on the front side of the planetary gear SP, and is contained, together with the friction plates 41, in a clutch drum 42. The clutch drum 42 is rotatably supported on the boss portion 3b.

A brake band 61 of the first brake B-1 formed by a band brake is placed around the outer peripheral side of the clutch drum 42. The end on the rear side of the clutch drum 42 is coupled to a coupling member 48 by spline coupling, and the coupling member 48 is coupled by spline coupling to the outer peripheral side of an extended portion 47 extending from the second sun gear S2 and on the inner peripheral side of a center support 90. A hydraulic servo (not shown) that tightens the brake band 61 of the first brake B-1 so that the clutch drum 42 can be locked is placed so as to be adjacent to the outer peripheral side of the clutch drum 42.

The friction plates 41 of the first clutch C-1 are placed on the outer peripheral side of the rear side of the hub member 29. A hydraulic servo 20 of the first clutch C-1 is placed on the rear side of the planetary gear SP, and is contained, together with friction plates 21, in a clutch drum 22. The clutch drum 42 is rotatably supported on the input shaft 12. The end on the rear side of the clutch drum 22 is coupled by spline coupling to the outer peripheral side of an extended portion 27 extending from the third sun gear S3 and on the inner peripheral side of the center support 90.

The above arrangement structure of the planetary gear SP, the first clutch C-1, the third clutch C-3, and the first brake B-1 is the arrangement structure similar to that of, for example, the existing automatic transmission that achieves six forward speeds and one reverse speed (see JP 2000-220704 A). The number of teeth of each gear of the planetary gear SP need only be changed, and substantially the same parts can be used as they are. Accordingly, like the existing automatic transmission that achieves six forward speeds and one reverse speed, for example, the first clutch C-1, the third clutch C-3, and the first brake B-1 can be arranged in a compact manner without causing interference between the members, and the above automatic transmission and the existing automatic transmission can be produced on a common production line.

Moreover, since the above arrangement structure of the planetary gear SP, the first clutch C-1, the third clutch C-3, and the first brake B-1 is similar to that of, for example, the existing automatic transmission that achieves six forward speeds and one reverse speed, the center support 90 and the counter gear 13 which are adjacent to these elements can be placed in a manner similar to that of the exiting automatic transmission that achieves six forward speeds and one reverse speed. Thus, the countershaft and the differential unit, both not shown, can be arranged in a similar arrangement structure, and the above automatic transmission and the existing automatic transmission can be produced on a common production line.

That is, the front half portion with respect to the planetary gear unit PU in the speed change mechanism $5_1$ can be configured in a manner similar to that of the existing automatic transmission that achieves six forward speeds and one reverse speed. Thus, the rear half portion of the automatic transmission $1_1$ where the planetary gear unit PU etc. is placed may be slightly extended rearward in the axial direction, but the rear half portion is configured not to have a large diameter so as not to interfere with the countershaft and the differential unit. This more easily allows this automatic transmission $1_1$ and the existing automatic transmission to be produced on a common production line.

The structure of the rear half portion of the speed change mechanism $5_1$ will be described below. The planetary gear unit PU, the second clutch C-2, the fourth clutch C-4, the second brake B-2, and the third brake B-3 are arranged on the outer peripheral side of the intermediate shaft 14 on the axially opposite side of the counter gear 13 from the planetary gear SP.

More specifically, in the planetary gear unit PU, the third sun gear S3 together with its extended portion 27 is rotatably supported and placed on the outer peripheral side of the intermediate shaft 14, and a plurality of short pinions PS (see FIG. 1) are arranged so as to be evenly distributed in the circumferential direction on the outer peripheral side of the tooth surface of the third sun gear S3.

The second sun gear S2 together with its extended portion 47 is rotatably supported and placed on the outer peripheral side of the extended portion 27 of the third sun gear S3. A plurality of stepped pinions PST are arranged so as to be evenly distributed in the circumferential direction on the outer peripheral side of the plurality of short pinions PS and the outer peripheral side of the tooth surface of the third sun gear S3 so as to extend between the short pinions PS and the third sun gear S3. As described above, the small diameter portion PSTa of each stepped pinion PST meshes with a corresponding one of the short pinions PS, and the large diameter portion PSTb of each stepped pinion PST meshes with the second sun gear S2. The plurality of short pinions PS and the plurality of stepped pinions PST are rotatably supported by the second carrier CR2 as a frame member having both side plates coupled by a bridge (not shown).

The third ring gear R3 is placed on the outer peripheral side of the small diameter portion PSTa of each stepped pinion PST so as to mesh therewith, and the second ring gear R2 is placed on the outer peripheral side of the large diameter portion PSTb of each stepped pinion PST so as to mesh therewith. The front side of the second ring gear R2 is coupled to the counter gear 13 rotatably supported by the center support 90.

The bridge (not shown) of the second carrier CR2 extends between the stepped pinions PST in the circumferential direction, and a hub member 79 extending on the outer peripheral side of the second ring gear R2 is fixedly attached to the bridge. Friction plates 71 of the second brake B-2 are arranged between the outer peripheral side of the hub member 79 and the case 3, and a hydraulic servo 70 of the second brake B-2 is placed on the front side of the friction plates 71 so as to overlap the outer peripheral side of the second ring gear R2.

On the other hand, a hub member 89 covering the rear side of the planetary gear unit PU and extending on the outer peripheral side of the third ring gear R3 is fixedly attached to the rear side of the third ring gear R3. Friction plates 81 of the third brake B-3 are arranged between the outer peripheral side of the hub member 89 and the case 3, and a hydraulic servo 80 of the third brake B-3 is placed on the rear side of the friction plates 81 so as to overlap the outer peripheral sides of the second clutch C-2 and the fourth clutch C-4 described below.

Thus, the friction plates 71 of the second brake B-2 and the friction plates 81 of the third brake B-3 are placed on the outer peripheral side of the planetary gear unit PU so as to overlap in the axial direction as viewed in the radial direction, whereby the second brake B-2 and the third brake B-3 can be placed without causing interference between the members. Since the friction plates 71 of the second brake B-2 and the friction plates 81 of the third brake B-3 are arranged within the range of the axial position of the planetary gear unit PU, the speed change mechanism $5_1$ can be configured in a compact manner in the axial direction.

A hub member 39 extending rearward is fixedly attached to the rear side of the hub member 89. Friction plates 31 of the second clutch C-2 are arranged between the outer peripheral side of the hub member 39 and the hydraulic servos 80 of the third brake B-3. On the rear side of the friction plates 31, a hydraulic servo 30 of the second clutch C-2 is placed on the outer peripheral side of a hydraulic servo 50 of the fourth clutch C-4 described below. The hydraulic servo 30 of the second clutch C-2 together with the friction plates 31 and the fourth clutch C-4 is contained in a clutch drum 32 configured integrally with the intermediate shaft 14. That is, the hydraulic servo 30 of the second clutch C-2 forms the outer one of the two hydraulic servos, that is, the inner and outer hydraulic servos formed like a two-story structure. The clutch drum 32 is rotatably supported on the boss portion 3a.

On the rear side of the hub member 89, a hub member 59 extending rearward is placed on the inner peripheral side of the second clutch C-2 so as to be spline coupled to the rear side plate of the second carrier CR2 at a position on the inner peripheral side of the hub member 89. Friction plates 51 of the fourth clutch C-4 are arranged between the outer peripheral side of the hub member 59 and the hydraulic servo 30 of the second clutch C-2.

The hydraulic servo 50 of the fourth clutch C-4 is placed on the inner peripheral side of the hydraulic servo 30 of the second clutch C-2 at a position located on the rear side and the inner peripheral side of the friction plates 51. The hydraulic servo 50 of the fourth clutch C-4 together with the second clutch C-2 is contained in the clutch drum 32. The hydraulic servo 50 of the fourth clutch C-4 is placed on the inner peripheral side of a clutch drum 52 fixedly attached to the front side of the clutch drum 32 and containing the friction plates 51. As described above, the hydraulic servo 50 of the fourth clutch C-4 forms the inner one of the two hydraulic servos formed like a two-story structure.

As described above, the hydraulic servo 30 of the second clutch C-2 and the hydraulic servo 50 of the fourth clutch C-4 are placed on the axially opposite side of the planetary gear unit PU from the counter gear 13, and the hydraulic servo 30 of the second clutch C-2 is placed on the outer peripheral side of the hydraulic servo 50 of the fourth clutch C-4 so as to overlap the hydraulic servo 50 in the axial direction as viewed in the radial direction. Thus, the second clutch C-2 and the fourth clutch C-4 can be arranged without causing interference between the members, and the speed change mechanism $5_1$ can be configured in a compact manner in the axial direction as compared to the case where the second clutch C-2 and the fourth clutch C-4 are arranged side by side in the axial direction.

According to the automatic transmission 1 described above, as shown in FIG. 2, the step between the first forward speed and the second forward speed is 1.933, the step between the second forward speed and the third forward speed is 1.431, the step between the third forward speed and the fourth forward speed is 1.205, the step between the fourth forward speed and the fifth forward speed is 1.218, the step between the fifth forward speed and the sixth forward speed is 1.120, the step between the sixth forward speed and the seventh forward speed is 1.114, the step between the seventh forward speed and the eighth forward speed is 1.033, the step between the eighth forward speed and the ninth forward speed is 1.061, and the step between the ninth forward speed and the tenth forward speed is 1.272. Thus, the automatic transmission $1_1$ capable of obtaining a relatively satisfactory step ratio between the shift speeds can be provided.

The gear spread from the minimum shift speed to the maximum shift speed (the gear ratio of the first forward speed 5.067/the gear ratio of the tenth forward speed 0.717) can be made as large as 7.067. This makes it easier to optimize the engine speed usage region with respect to the vehicle speed in a vehicle having the automatic transmission $1_1$ mounted thereon, and can improve fuel economy.

Moreover, since the tenth forward speed as the maximum shift speed is achieved by engagement of the fourth clutch C-4 and the first brake B-1, the maximum shift speed can be obtained by meshing at only two locations, namely, meshing between the second sun gear S2 and the large diameter portion PSTb of the stepped pinion PST and meshing between the second ring gear R2 and the large diameter portion PSTb of the stepped pinion PST. This can minimize gear meshing loss at the maximum shift speed that is used for a relatively long time, and can improve fuel economy.

With the configuration of the automatic transmission $1_1$, the automatic transmission can be configured by replacing a long pinion of a Ravigneaux type planetary gear set with a stepped pinion and adding the third ring gear R3, the second clutch C-2, and the third brake B-3 to, for example, the existing automatic transmission (see JP 2000-220704 A). Moreover, the automatic transmission having a relatively satisfactory step ratio and an increased gear spread as described above can be configured substantially without changing the size of the existing automatic transmission.

In other words, the automatic transmission having a satisfactory step ratio and a satisfactory gear spread with respect to the existing automatic transmission can be configured under significant restrictions such as size restriction and restriction of the production line of automatic transmissions. Thus, this automatic transmission can be manufactured by using a large part of the production line of the existing automatic transmission, which eliminates the need for cost to newly construct a production line. Therefore, the automatic transmission capable of achieving ten forward speeds and one reverse speed can be provided at low cost.

It should be understood that since the output member is formed by the counter gear 13 placed between the planetary gear SP and the planetary gear unit PU in the axial direction, the automatic transmission $1_1$ can be used in a preferable manner in vehicles in which an output shaft (crankshaft) of the engine 2 is placed transversely with respect to the travel direction of the vehicle.

Second Embodiment

A second embodiment in which the first embodiment is partially modified will be described with reference to FIGS. 5 to 8. In the second embodiment, portions similar to those of the automatic transmission $1_1$ according to the first embodiment will be denoted by the same reference characters, and description thereof will be omitted.

Figure 4:
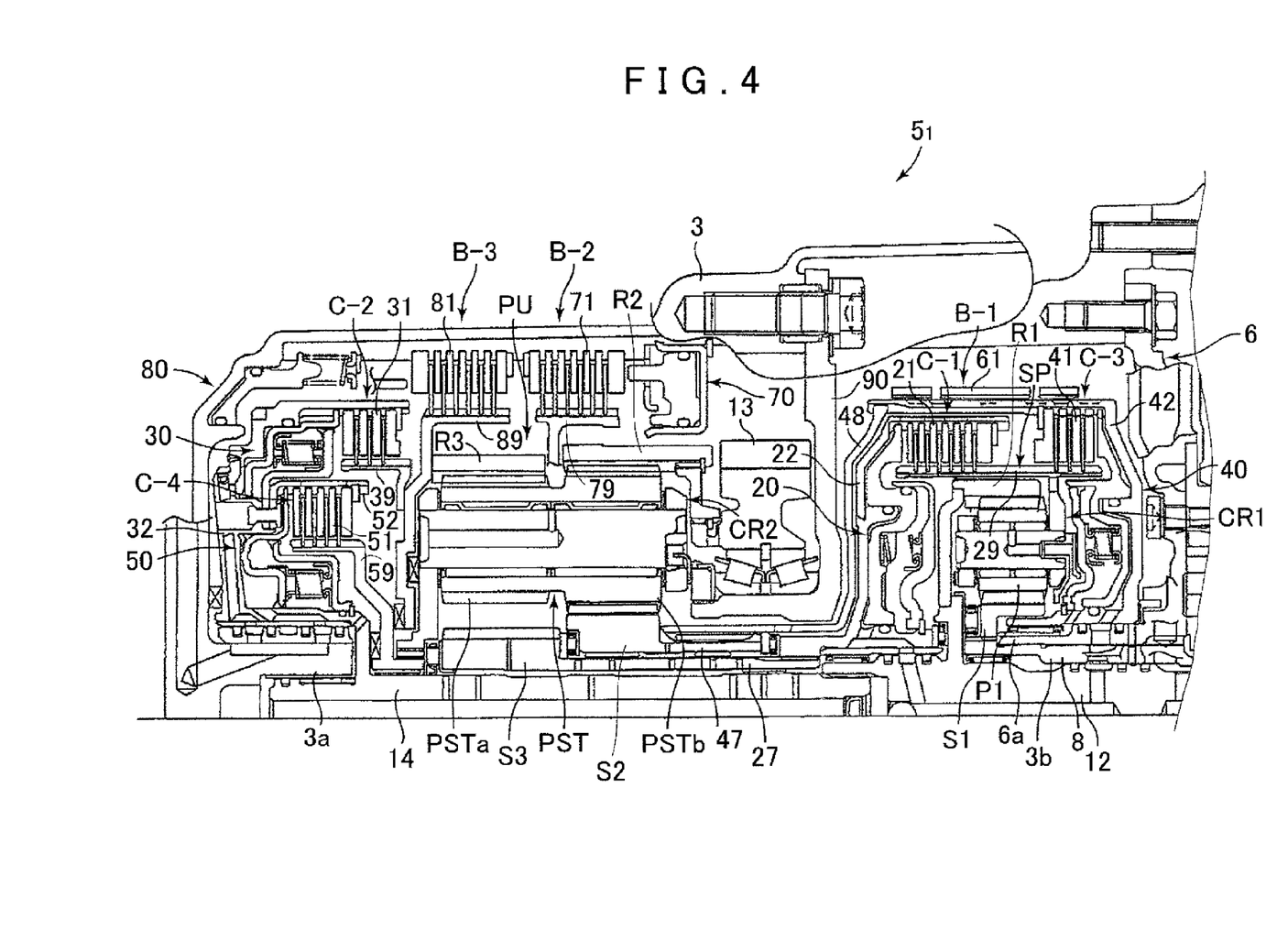
FIG. 4 is a sectional view showing a speed change mechanism $5_1$ of the automatic transmission $1_1$ according to the first embodiment.
Figure 5:
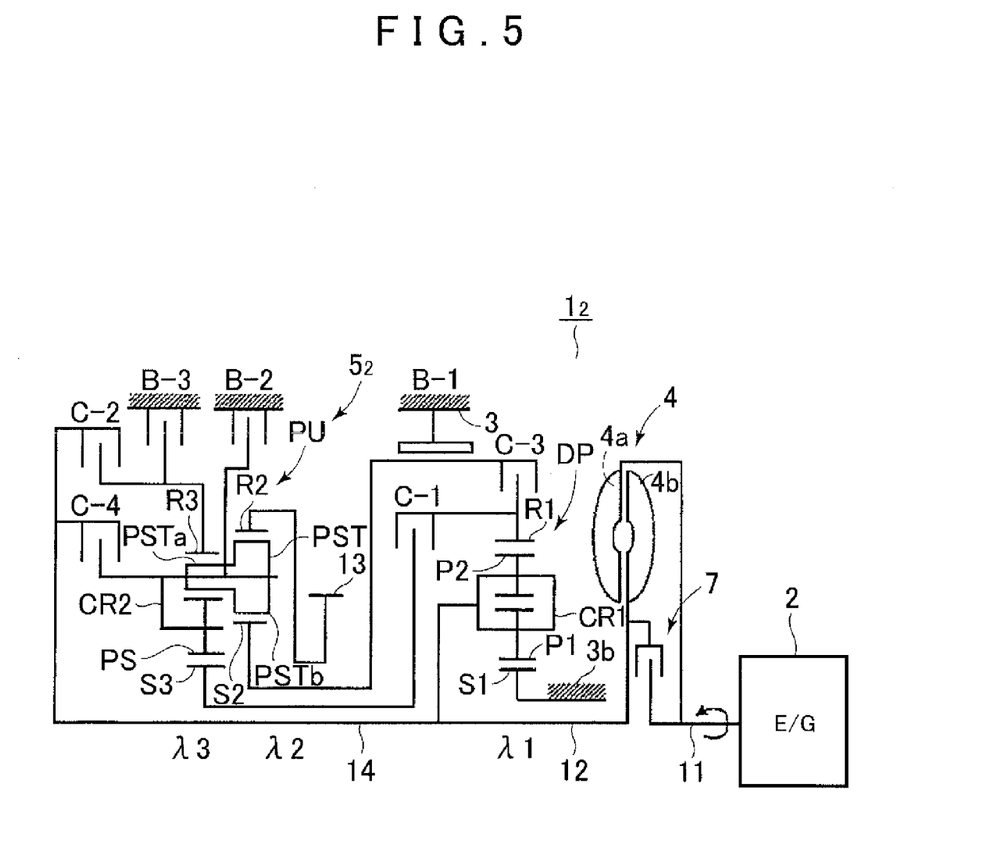
FIG. 5 is a skeleton diagram showing an automatic transmission $1_2$ according to a second embodiment.
Figure 8:
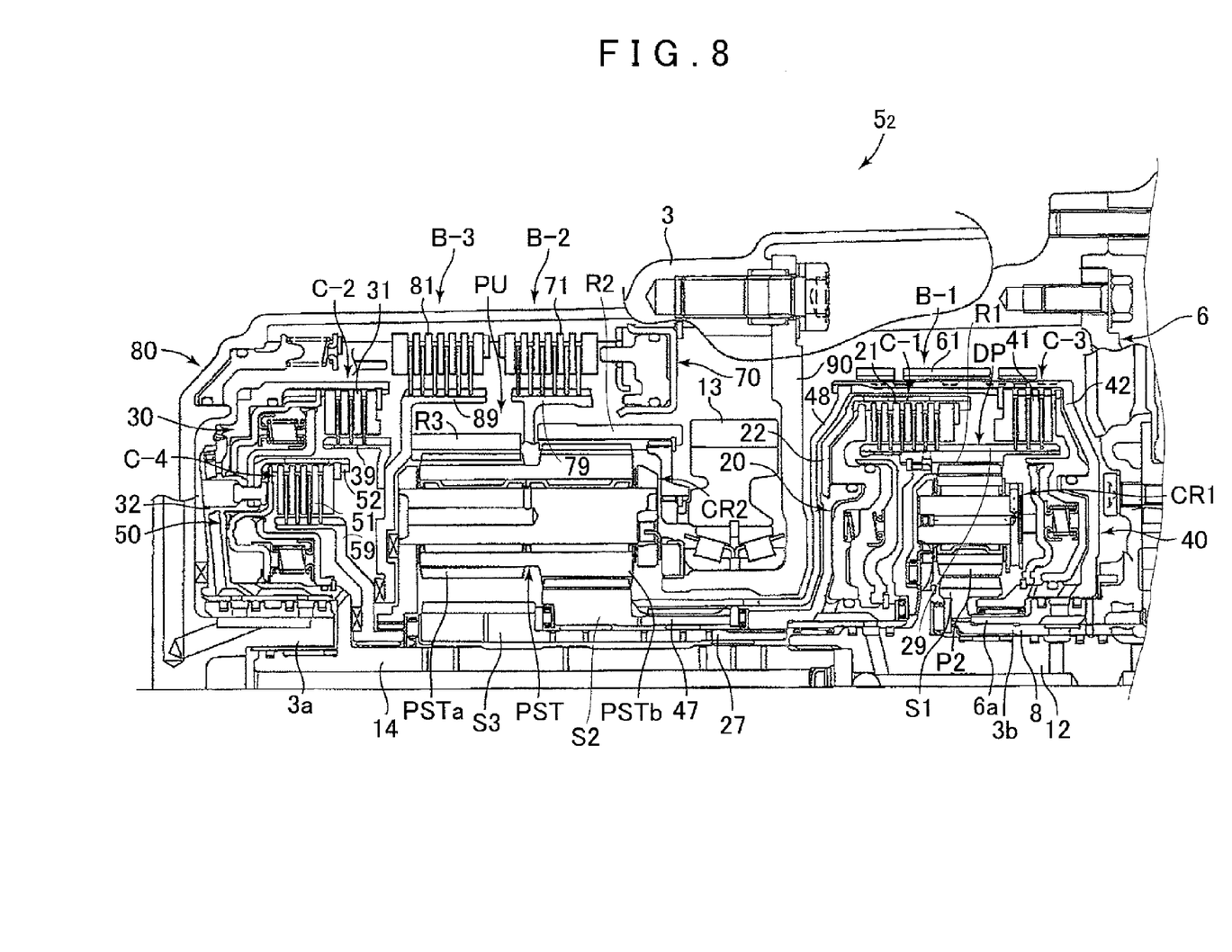
FIG. 8 is a sectional view showing a speed change mechanism $5_2$ of the automatic transmission $1_2$ according to the second embodiment.

An automatic transmission $1_2$ according to the second embodiment is different from the first embodiment in that the planetary gear SP outputting the decelerated rotation shown in FIGS. 1 and 4 is replaced with a double pinion planetary gear shown in FIGS. 5 and 8. Specifically, in a planetary gear DP, a first carrier CR1 has a first pinion P1 meshing with a first sun gear S1, and a second pinion P2 meshing with the first pinion P1 and a first ring gear R1, and rotatably supports the first pinion P1 and the second pinion P2.

As shown in FIGS. 5 and 8, this planetary gear SP is configured so that the first sun gear S1 is fixed to a boss portion 3b, the first carrier CR1 is coupled to an input shaft 12, and the first ring gear R1 is formed integrally with a hub member 29 that is drivingly coupled to friction plates 21 of a first clutch C-1 and friction plates 41 of a third clutch C-3, namely, decelerated rotation is output from the first ring gear R1.

Figure 7:
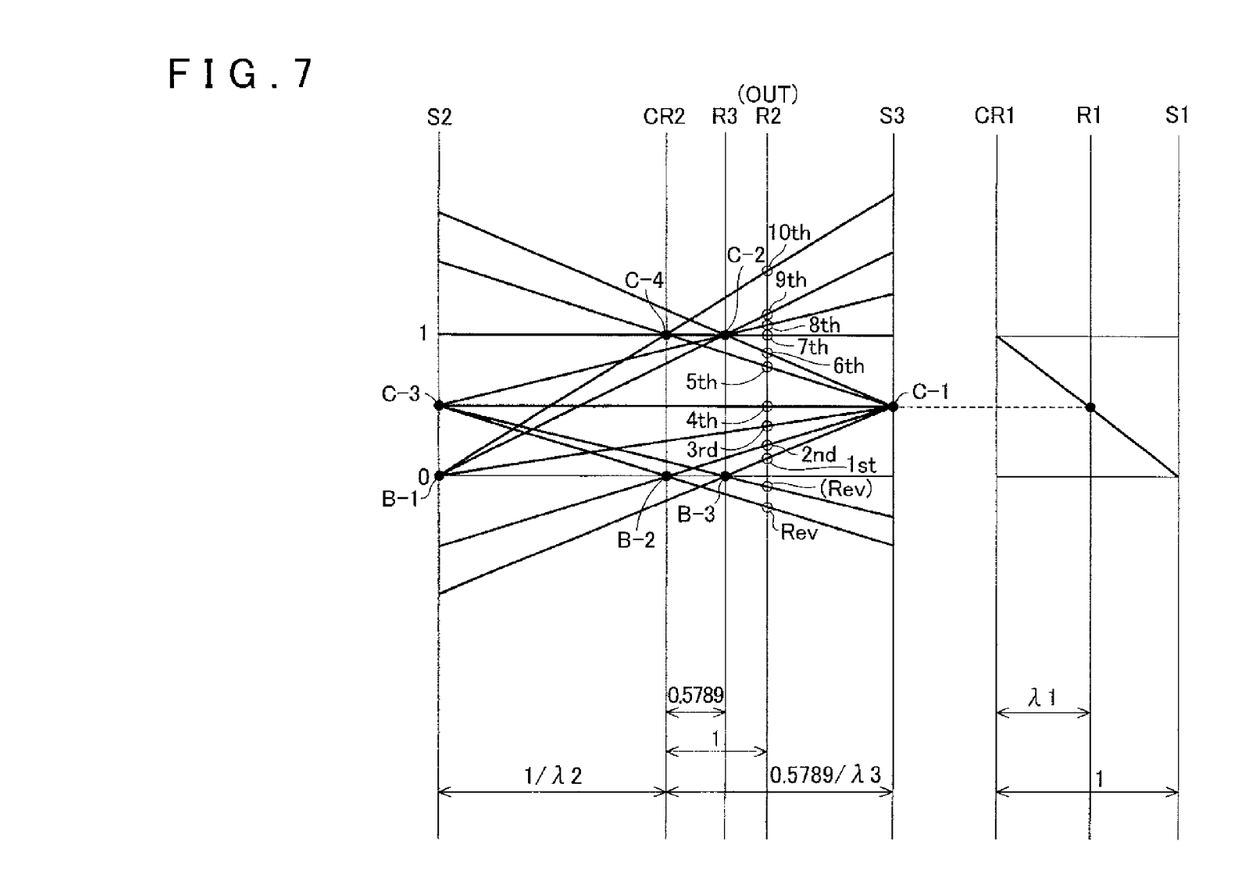
FIG. 7 is a velocity diagram of the automatic transmission $1_2$ according to the second embodiment.

In the case where the planetary gear DP that outputs the decelerated rotation is formed by the double pinion planetary gear as described above, a large speed reduction ratio can be achieved even if the double pinion planetary gear has substantially the same diameter as that of the single pinion planetary gear of the first embodiment, as shown in FIG. 7.

Figure 6:
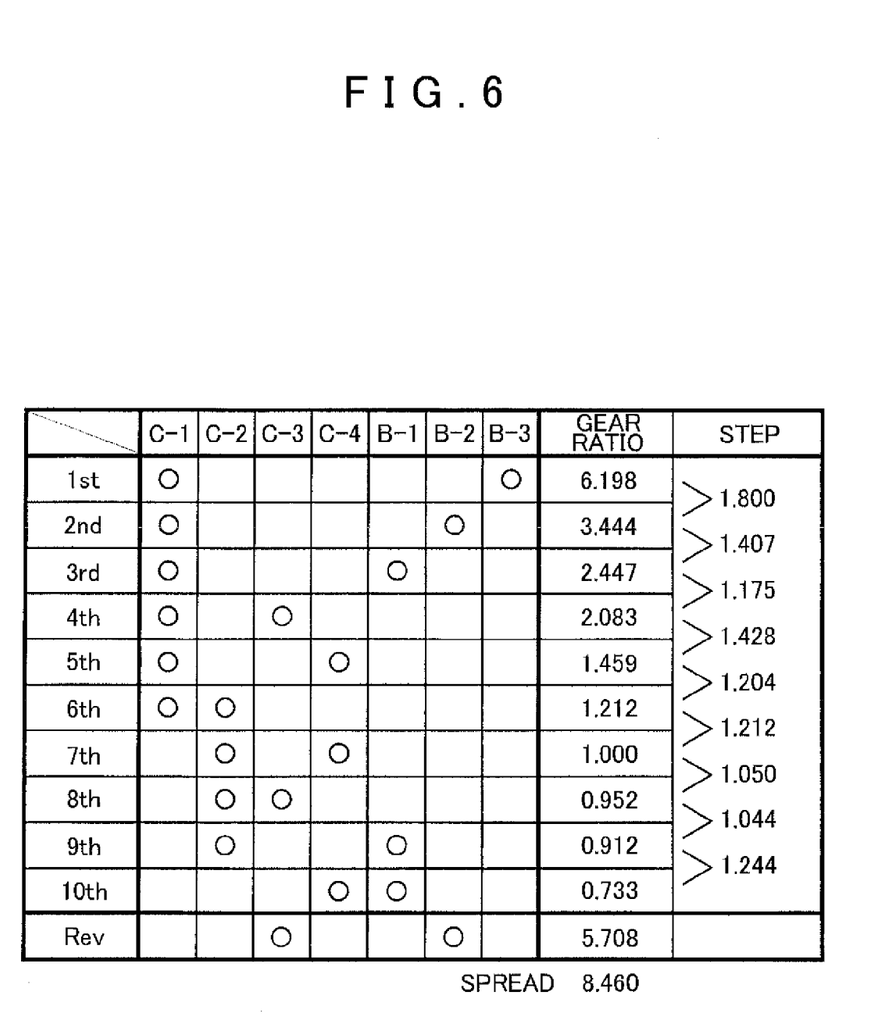
FIG. 6 is an engagement table of the automatic transmission $1_2$ according to the second embodiment.

Thus, as shown in FIG. 6, by optimizing setting of the ratios of the number of teeth $\lambda 1$, $\lambda 2$, and $\lambda 3$, the gear ratio of the first forward speed can be set to 6.198, the gear ratio of the second forward speed can be set to 3.444, the gear ratio of the third forward speed can be set to 2.447, the gear ratio of the fourth forward speed can be set to 2.083, the gear ratio of the fifth forward speed can be set to 1.459, the gear ratio of the sixth forward speed can be set to 1.212, the gear ratio of the seventh forward speed can be set to 1.000, the gear ratio of the eighth forward speed can be set to 0.952, the gear ratio of the ninth forward speed can be set to 0.912, and the gear ratio of the tenth forward speed can be set to 0.733.

Thus, according to the automatic transmission $1_2$, as shown in FIG. 6, the step between the first forward speed and the second forward speed is 1.800, the step between the second forward speed and the third forward speed is 1.407, the step between the third forward speed and the fourth forward speed is 1.175, the step between the fourth forward speed and the fifth forward speed is 1.428, the step between the fifth forward speed and the sixth forward speed is 1.204, the step between the sixth forward speed and the seventh forward speed is 1.212, the step between the seventh forward speed and the eighth forward speed is 1.050, the step between the eighth forward speed and the ninth forward speed is 1.044, and the step between the ninth forward speed and the tenth forward speed is 1.244. Thus, the automatic transmission $1_2$ capable of obtaining a relatively satisfactory step ratio between the shift speeds can be provided.

The gear spread from the minimum shift speed to the maximum shift speed (the gear ratio of the first forward speed 6.198/the gear ratio of the tenth forward speed 0.733) can further be increased to 8.460. This makes it easier to optimize the engine speed usage region with respect to the vehicle speed in a vehicle having the automatic transmission $1_2$ mounted thereon, and can improve fuel economy.

The planetary gear DP in the second embodiment can use a double pinion planetary gear for use in, for example, the existing automatic transmission that achieves eight forward speeds and one reverse speed, and the production line of the double pinion planetary gear can be used as it is. This eliminates the need for cost to newly construct a production line, and the automatic transmission capable of achieving ten forward speeds and one reverse speed can be provided at low cost.

Since the configuration, functions, and effects of the second embodiment are otherwise similar to those of the first embodiment, description thereof will be omitted.

The first and second embodiments are described above with respect to an example in which the automatic transmission of the present invention is used for FF type vehicles. However, it is to be understood that this automatic transmission can be applied to any vehicles in which an output shaft of an engine is placed transversely, such as rear-engine, rear-drive (RR) type vehicles and mid-engine, rear-drive (MR) type vehicles.

The first and second embodiments are described with respect to an example in which the automatic transmission changes the speed of rotation output from the engine 2. However, the present invention is not limited to this, and the present invention is also applicable to automatic transmissions that changes the speed of rotation output from a motor generator. That is, the automatic transmission of the present invention can be used for hybrid vehicles and electric cars.

The arrangement of the friction plates of the clutches and brakes and the hydraulic servos of the automatic transmission, the arrangement of the reduction planetary gear, the arrangement of the planetary gear set, the arrangement of the output member, etc. described in the first and second embodiments are shown by way of example, design of the arrangement structure can be changed particularly if a similar coupling relation between the gears and the clutches and brakes is maintained, and such a changed arrangement structure is within the scope of the present invention.

The automatic transmission according to the present invention can be used for vehicles such as passenger cars and trucks, and is preferably used particularly for vehicles that achieve at least ten forward speeds and one reverse speed, achieve downsizing and weight reduction, and are desired to increase the gear spread and to reduce gear meshing loss at the maximum shift speed.

What is claimed is:

1. An automatic transmission, comprising:
an input shaft that is drivingly coupled to a drive source;
a reduction planetary gear that has a first sun gear, a first carrier, and a first ring gear, and that can output decelerated rotation decelerated from input rotation of the input shaft;
a planetary gear set that has a second sun gear, a third sun gear, a second carrier supporting a short pinion meshing with the third sun gear and a stepped pinion having a small diameter portion meshing with the short pinion and a large diameter portion meshing with the second sun gear such that the short pinion and the stepped pinion are rotatable, a second ring gear meshing with the large diameter portion, and a third ring gear meshing with the small diameter portion;
a first clutch capable of inputting the decelerated rotation of the reduction planetary gear to the third sun gear;
a second clutch capable of inputting the input rotation of the input shaft to the third ring gear;
a third clutch capable of inputting the decelerated rotation of the reduction planetary gear to the second sun gear;
a fourth clutch capable of inputting the input rotation of the input shaft to the second carrier;
a first brake capable of preventing the second sun gear from rotating;
a second brake capable of preventing the second carrier from rotating;
a third brake capable of preventing the third ring gear from rotating; and
an output member drivingly coupled to the second ring gear, wherein
the automatic transmission is configured to achieve at least ten forward speeds and one reverse speed.

2. The automatic transmission according to claim 1, wherein
the reduction planetary gear is formed by a double pinion planetary gear in which the first carrier has a first pinion meshing with the first sun gear and a second pinion meshing with the first pinion and the first ring gear, and rotatably supports the first pinion and the second pinion, and
the first sun gear is held stationary, the input shaft is drivingly coupled to the first carrier, and the decelerated rotation is output from the first ring gear.

3. The automatic transmission according to claim 1, wherein
the output member is formed by a counter gear placed between the reduction planetary gear and the planetary gear set in an axial direction.

4. The automatic transmission according to claim 3, wherein
a friction plate of the second brake and a friction plate of the third brake are placed on an outer peripheral side of the planetary gear set so as to overlap in the axial direction as viewed in a radial direction.

5. The automatic transmission according to claim 3, wherein
a hydraulic servo of the second clutch and a hydraulic servo of the fourth clutch are placed on an axially opposite side of the planetary gear set from the output member, and the hydraulic servo of the second clutch is placed on an outer peripheral side of the hydraulic servo of the fourth clutch so as to overlap in the axial direction as viewed in the radial direction.

6. The automatic transmission according to claim 3, wherein
the first clutch, the third clutch, and the first brake are placed on an axially opposite side of the output member from the planetary gear set.

* * * * *